Feb. 25, 1958     G. A. SCHURMAN ET AL     2,825,039
CONNECTOR FOR DETECTOR CABLE
Filed March 24, 1954     3 Sheets-Sheet 1
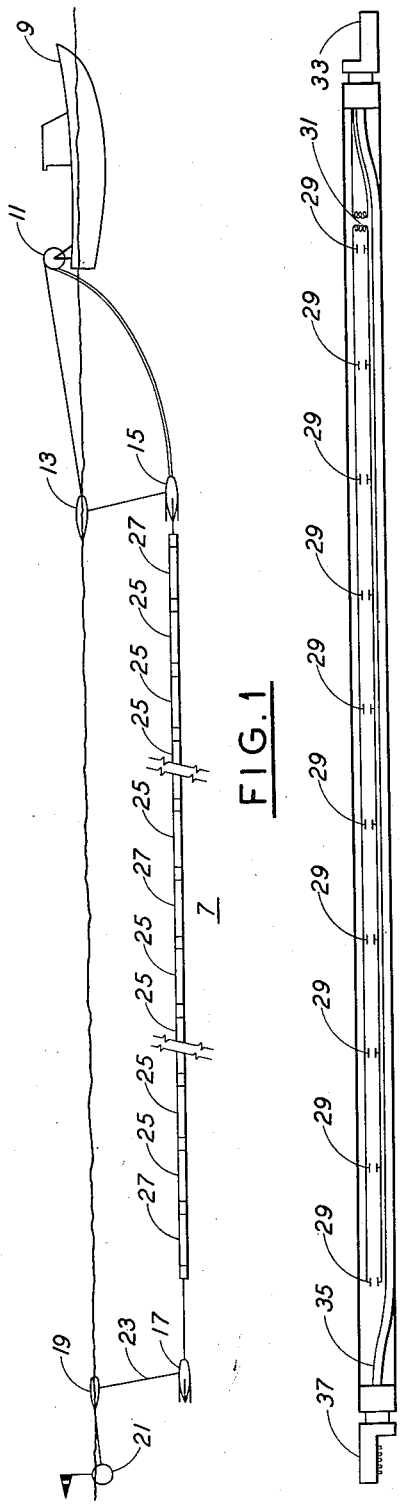
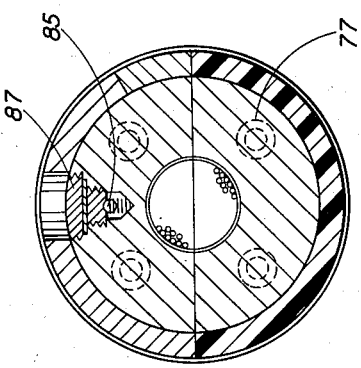
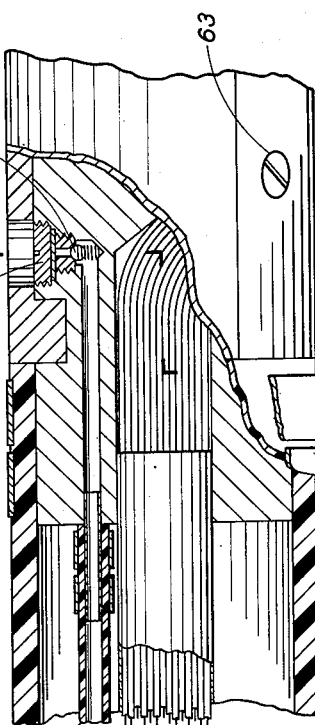
INVENTORS
GLENN A. SCHURMAN
PAUL M. AAGAARD
BY
ATTORNEYS Feb. 25, 1958     G. A. SCHURMAN ET AL     2,825,039
CONNECTOR FOR DETECTOR CABLE
Filed March 24, 1954     3 Sheets-Sheet 2
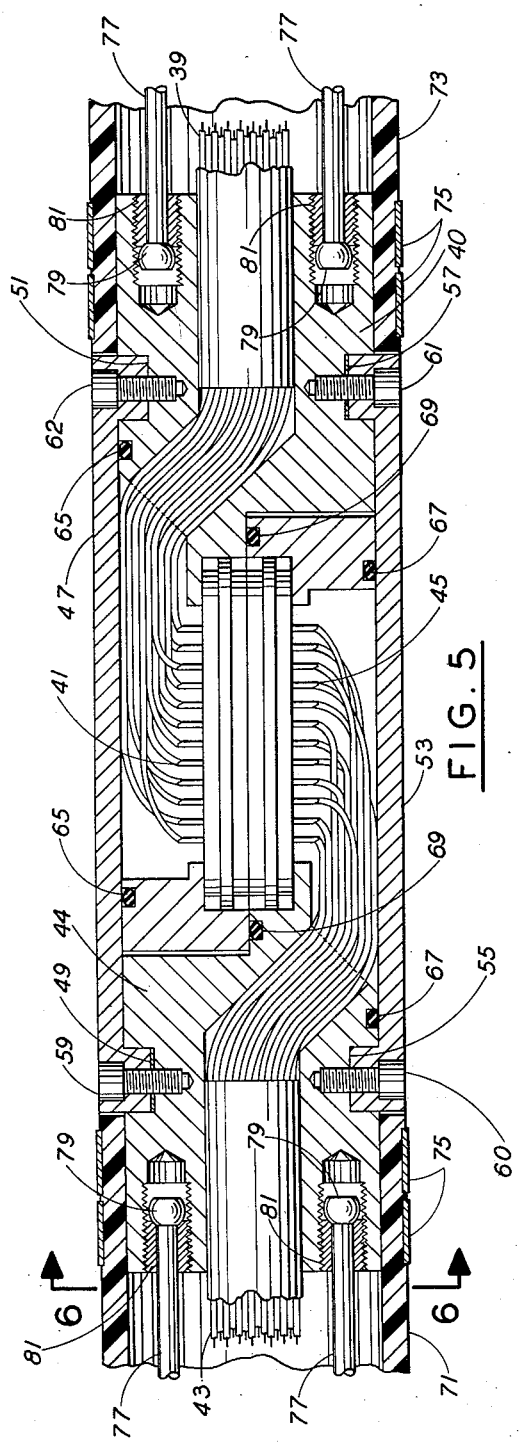
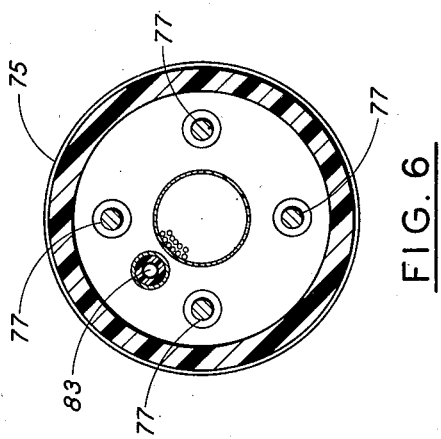
INVENTORS
GLENN A. SCHURMAN
PAUL M. AAGAARD
BY
ATTORNEYS

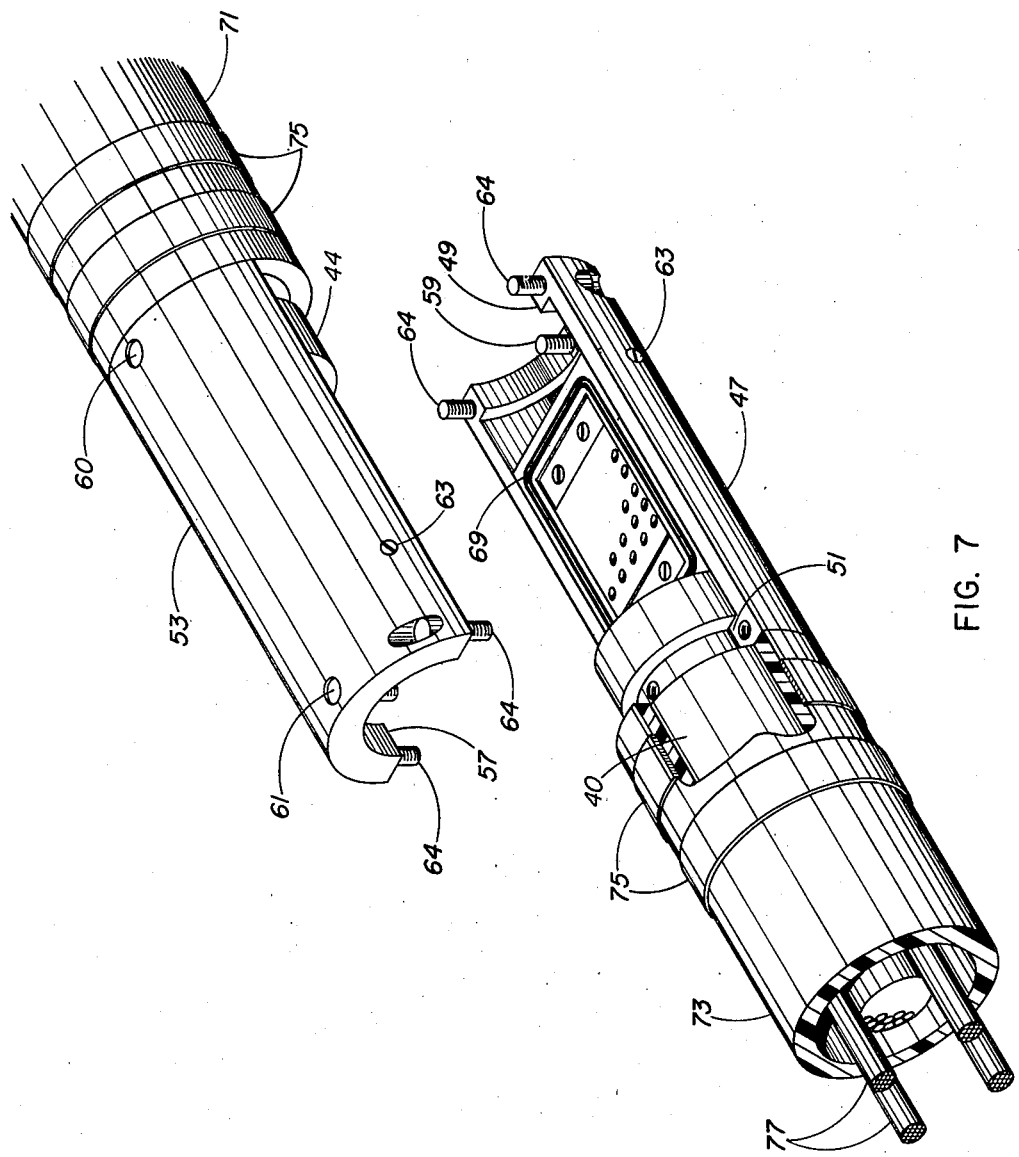

United States Patent Office 2,825,039
Patented Feb. 25, 1958

2,825,039

CONNECTOR FOR DETECTOR CABLE

Glenn A. Schurman, Whittier, and Paul M. Aagaard, Rivera, Calif., assignors to California Research Corporation, San Francisco, Calif., a corporation of Delaware Application March 24, 1954, Serial No. 418,391

1 Claim. (Cl. 339—92)

Our invention relates to a multi-conductor coupling and particularly to a coupling for use in a seismic prospecting cable.

Offshore seismic prospecting has been performed with the use of a neutral buoyancy seismic detector cable. Such a cable may be 3000 feet in length and be made up of fifty-foot sections. Prior cable sections of which we are aware have a number of pressure detectors distributed through each section of the cable. Several of the detectors provide a signal which is combined to provide one recorded trace. The number of leads coming from the detector cable to the recording boat is minimized in order to minimize the difficulty of connecting the cable sections together. It has been found desirable in some areas to record a large number of seismic traces which, under present practice, requires twice the number of conductors through the cable as there are to be traces recorded. Accordingly, it has been found difficult to connect the detector sections together electrically and mechanically so that a long cable may be used to provide a number of seismic traces at the recorder. Further, such a connector must be readily detachable in order to permit the replacement of cable sections which become snagged or damaged in the water.

Accordingly, it is an object of our invention to provide an electric connector for use in joining a large number of wires in a seismic prospecting cable.

It is a further object of our invention to provide a connector between seismic cable sections which isolates a large number of circuits from each other and permits cable sections to be joined and separated readily. In a connector according to our invention wires from each cable section pass through a constricted curved passage to electrical terminals on plug-in type connectors of which the prongs and sockets are perpendicular to the axis of the cable. The connector has the same cross-section as that of the cable sections which it connects.

The novel features of our invention are set forth with more particularity in the accompanying claim. The invention itself, however, with respect to the details thereof, together with its additional advantages, may be better understood from the following description of a specific embodiment with reference to the accompanying drawings, in which:

Fig. 1 shows a seismic cable in position to be used;

Fig. 2 shows schematically the arrangement of the parts of a seismic cable;

Fig. 3 shows a partial cross-section of a connector according to our invention;

Fig. 4 shows a cross-section of the connector shown in Fig. 3;

Figs. 5 and 6 show cross-sections of a connector according to our invention; and Fig. 7 shows an isometric view of the two mating halves of the connector.

As shown in Fig. 1, a seismic cable 7 is towed behind a boat 9. A reel 11 on the boat 9 is attached to a buoy 13 and a paravane 15. The paravane is attached to the cable 7 and arranged to maintain a constant depth below the surface of the water. A second paravane 17 at the other end of the cable 7 maintains the rear end of the cable at a constant level below the surface. Rear buoy 19 and marker buoy 21 are attached to the rear paravane 17 by a cable 23 which has a length determined by the depth at which the cable 7 is to be towed. The cable, itself, consists of a number of active detector sections 25 and a number of inactive sections 27. The sections 25 contain detectors which are adapted to detect pressure variations in the water. The inactive sections 27 contain conductors which transmit signals from the detector sections.

In operation, the cable is reeled out on the reel 11 when the boat 9 is in the vicinity which is to be explored. The paravane 15 and 17 are located at the desired depth below the surface of the water. The boat 9 moves over the prospect at a slow rate of speed and a charge of explosive is detonated near the center of the cable 7. The inactive section 27 at the center of the cable serves to separate active sections 25 from the immediate vicinity of the shot in order to avoid having the explosive damage the pressure detectors. The inactive sections 27 at the ends of the cable serve as terminations for the cable. Signals from the pressure detector are transmitted through a cable to the boat 9, where they are recorded. The pressure signals from each active section 25 of the cable 7 may be recorded separately, or signals from the various sections 25 may be mixed and recorded.

Fig. 2 shows a schematic diagram of the electrical arrangement of the cable. Since, in the preferred embodiment of our invention, we enjoy a piezoelectric crystal, the detectors are shown as capacitors 29. A number of detectors are connected in parallel in order to achieve the desired power sensitivity to pressure variations. An impedance matching transformer 31 is connected to the detectors. Two wires from the transformer 31 lead to the female connector 33. A bundle of wires 35 conducts signals from the male connector 37 to the female connector 33 of the detector cable. By means of the connectors 33 and 37, series of pressure detector cables may be connected together. The inactive sections 27 do not contain detectors, but only contain wires between their two connectors 33 and 37.

A sectional view of the connector is shown in Fig. 5. Wires 39 pass from the interior of a cable section through a passageway in an end element 40 and are connected to terminals 41 at the back of the female plug. Wires 43 pass from the interior of an adjoining cable section through a passageway in an end element 44 and are connected to terminals 45 at the back of the male plug. The male and female plugs are joined at a plane of contact which lies in the axis of the connector. In the preferred embodiment of our invention, there are at least 72 contacts 41 and 45, and 72 prongs and sockets in the connector. If these elements are made sufficiently large to give them adequate mechanical strength, they occupy an area greater than the cross-section of the connector. Accordingly, they are placed in a plane with the axis of the connector, and thus we can accommodate many more wires than would be possible if the axis of the pins were parallel to the axis of the cable, since it is required that the cross-sectional area of the coupling remain the same as that of the cable.

The connector is subjected to rough field use. Accordingly, the cable will be reeled on a drum or reeled off of the drum over the side of the boat while the boat is in motion. This will cause a repeated flexure of the cable. If such a flexure were allowed to reach the terminals 41 and 45 of the connector, the solder joints between the wires 39 and 43 and the terminals 41 and 45 would be destroyed. Accordingly, we have provided that the wires 39 pass through a constricted curved passageway in the end element 40 to reach the contacts 41, thus relieving the contact 41 of mechanical stress. A similar curved passageway in the end element 44 leads the wires 43 to the contacts 45.

As shown in Figure 7, a cylindrical shell 47 covers the terminals 41 of the female connector and has ring-like protrusions 49 and 51 which respectively engage a circumferential groove in the end element 44 of the male section of the connector and the circumferential groove in the end element 40 of the female section of the connector. The cover shell 53 has ring-like protrusions 55 and 57 which engage circumferential grooves on the male and female sections of the connector, respectively. The cover shells 47 and 53 constitute the strength members which join the male and female sections of the connector. The protrusions 49, 51, 55 and 57 provide a plane of contact around the circumference of the connector. This plane of contact is perpendicular to the axis of the connector, and the thrust exerted on the coupling as the cable is dragged through the water is borne on this plane of contact. Thus, the sections of the connector are joined together by a mechanical coupling which does not rely on friction or on bolts. The cover shells are secured by socket head screws 59, 60, 61 and 62. The screws 59 and 61 are captive in the cover plate but fit into tapped holes in the coupling sections. The screws 60, 62 and the four screws 63 pass through the cover plate into tapped holes in the coupler sections and serve to secure the cover plates to the coupling sections while the screws 59 and 61 serve also as a jack to separate the male and female contacts. In the preferred practice of our invention, there are 72 contacts in the coupling section. We have found that about 200 pounds of pressure is required to separate the male and female contacts. This separation is facilitated by backing out the screws 59 and 61 and forcing the couplings apart.

On assembly, after screws 59 and 61 have been inserted and tightened, the four socket head screws 64 are inserted and secured. The screws 64 securely clamp shells 47 and 53 around the coupler sections, thereby increasing the pressure on rubber seals 65, 67 and 69. The screws 64 lend additional bending strength to the coupling and prevent the coupling from breaking open during the spooling operation over drum 11.

A rubber seal 65, shown in Fig. 5, lies between the cover plate 47 and the female section of the connector. In the preferred practice of our invention, seal 65 is an O seal ring which prevents water which enters the male portion of the plug from flowing under the cover plate to the back terminals 41 of the female portion of the plug. Similar rubber seal rings 67 lie under the cover plate 53. To further isolate the terminals 41 and 45 from the water, another rubber seal 69 is used (Figs. 5 and 7).

The pressure detectors lie within a tube of natural rubber or an artificial rubber such as neoprene 71 and 73 which is at either side of the connector. The end elements 40 and 44 of the connector may have a 2-inch outer diameter to fit into the neoprene tube which has an inner diameter of 2 inches and a 3/16 inch wall thickness. A respective pair of metal bands 75 secure the neoprene tubes to the connector end elements. Four strength members 77 transmit the mechanical force from one connector to the connector at the other end of the tube. These strength members 77 have an enlarged end section 79 (Fig. 5) and are secured to the connector by nuts 81.

The cable sections are designed to have neutral buoyancy in salt water. The density of the water, however, varies from place to place. Accordingly, the tube 83 (Figs. 3 and 6) is provided. Oil is pumped into or out of this tube to adjust the buoyancy of the cable section. At the mouth of the tube 83 is a ball check valve 85 and a screw cover 87. The cover 87 may be removed and oil under pressure applied to the ball check valve 85 to pump oil into the tube 83. If oil is to be removed from the tube 83, the ball check valve 85 is depressed and the oil permitted to flow out.

We claim:

A connector means for detachably connecting two sections of a submarine seismic detector cable together electrically and mechanically comprising a first end element secured to and closing an end of one of said sections and extending outwardly therefrom, an axially disposed passageway extending through said end element and communicating with the interior of said cable section, a radially displaced offset of said passageway extending said passageway to the exterior of said end element, a group of electrical conductors disposed through said passageway and said offset and extending from the interior of the cable section to the exterior of said end element, a first plug board connected to the exterior ends of said electrical conductors and having respective separate connections for each of said electrical conductors, a shoulder on said end element to support a surface of said first plug board in an axial plane with respect to said connector means, a second end element similar to the first said end element and secured to and closing an end of another section of said seismic detector cable, a second group of electrical conductors disposed through an axial passageway and offset and extending from the interior of the said other section of said seismic cable to the exterior of said second end element, a second plug board connected to the exterior ends of said second group of electrical conductors and having respective separate connections for each of said electrical conductors, a shoulder on said second end element to support a surface of said second plug board in an axial plane with respect to said connector means and in a position closely adjacent to and in alignment with the said surface of said first plug board, said separate connections on said first plug board and said second plug board comprising complementary separable electrical contact means between the said first plug board and the said second plug board to connect individual electrical conductors of the first said group of electrical conductors to individual conductors of the said second group of electrical conductors, a stress-transmitting cover formed of similar complementary semi-cylindrical half portions detachably connecting together the said first and the said second end elements and enclosing the connected plug boards within a fluid-tight chamber, a first circumferential groove formed in the radially exterior surface of the said first end element, a first integral protrusion extending radially inwardly from the inner surface of said cover adjacent one axial end thereof and engaging said first groove, a second circumferential groove formed in the radially exterior surface of said second end element, a second integral protrusion extending radially inwardly from the inner surface of said cover adjacent the other axial end thereof and engaging said second groove, means to secure said cover portions to said first and said second end elements, and flexible sealing means positioned between said end elements and said cover to exclude water from said electrical conductors and said electrical contact means at said plug board.

References Cited in the file of this patent

UNITED STATES PATENTS

| 2,437,358 | Mowery | Mar. 9, 1948 |
| 2,668,885 | Gerlat | Feb. 9, 1954 |
| 2,700,141 | Jones | Jan. 16, 1955 |

FOREIGN PATENTS

| 20,367 | Great Britain | of 1891 |